(12) United States Patent
Cho et al.

(10) Patent No.: US 12,227,247 B2
(45) Date of Patent: Feb. 18, 2025

(54) APPARATUS FOR SUPPORTING VEHICLE BODY DURING ASSEMBLY

(71) Applicants: HYUNDAI MOTOR COMPANY, Seoul (KR); KIA CORPORATION, Seoul (KR)

(72) Inventors: Min Ick Cho, Ulsan (KR); Jungmin Kang, Ulsan (KR); Jeong Hwan Ha, Gyeongju-si (KR); Suwhan Kim, Ulsan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 299 days.

(21) Appl. No.: 17/956,289

(22) Filed: Sep. 29, 2022

(65) Prior Publication Data

US 2023/0182837 A1 Jun. 15, 2023

(30) Foreign Application Priority Data

Dec. 13, 2021 (KR) .......................... 10-2021-0177457

(51) Int. Cl.
*B62D 65/18* (2006.01)
*B62D 65/02* (2006.01)
(52) U.S. Cl.
CPC .......... *B62D 65/18* (2013.01); *B62D 65/026* (2013.01)

(58) Field of Classification Search
CPC ...... B62D 65/18; B62D 65/026; B25H 1/0007
See application file for complete search history.

(56) References Cited

U.S. PATENT DOCUMENTS

| 8,882,094 B2 * | 11/2014 | Kim ..................... B62D 65/18 |
| | | 29/430 |
| 2008/0000069 A1 * | 1/2008 | Savoy ................... B62D 65/02 |
| | | 29/430 |
| 2018/0273243 A1 * | 9/2018 | Kilibarda ............. B23K 37/047 |

\* cited by examiner

*Primary Examiner* — Jason L Vaughan
*Assistant Examiner* — Amanda Kreiling
(74) *Attorney, Agent, or Firm* — MCDONNELL BOEHNEN HULBERT & BERGHOFF LLP

(57) ABSTRACT

An apparatus for supporting a vehicle body during assembly includes a support frame, at least one first vehicle body supporting portion installed on a front portion of the support frame to be movable in a vehicle width direction, at least one first position adjustment unit installed on the front portion of the support frame and configured to manually vary a position of a corresponding first vehicle body supporting portion, at least one second vehicle body supporting portion installed on a rear portion of the support frame to be capable of clamping, and at least one second position adjustment unit installed on the rear portion of the support frame and configured to manually vary a position in a vehicle length direction of a corresponding second vehicle body supporting portion.

18 Claims, 16 Drawing Sheets

APPARATUS FOR SUPPORTING VEHICLE BODY DURING ASSEMBLY

CROSS REFERENCE TO RELATED APPLICATIONS

This application claims priority to and the benefit of Korean Patent Application No. 10-2021-0177457 filed in the Korean Intellectual Property Office on Dec. 13, 2021, the entire contents of which are incorporated herein by reference.

BACKGROUND

(a) Field

The present disclosure relates to a vehicle body assembling system. More particularly, the present disclosure relates to an apparatus for supporting a vehicle body during assembly, which is applicable in a vehicle body assembling line for assembling a vehicle body.

(b) Description of the Related Art

In general, a vehicle body is manufactured in a vehicle body assembling line (frequently called a body build line (BB line) by a person skilled in the art), as a body-in-white (BIW) form in which a plurality of vehicle body component parts are assembled.

In the vehicle body assembling line, the plurality of vehicle body component parts are welded by a welding robot on a bogie that is transported along a preset transport path. Furthermore, the plurality of vehicle body component parts may be welded on a jig frame fixed to the process floor of a vehicle body assembly process by a welding robot. Here, the plurality of vehicle body component parts may include a floor assembly, a side assembly welded to the floor assembly, and a roof assembly welded to the side assembly, as a vehicle body lower portion.

Meanwhile, the bogie is transferred to a plurality of welding processes in vehicle body assembling line on a conveyor or a transfer rail. It is difficult to universally use such a bogie for vehicle bodies of multiple types of vehicles having various shapes and sizes, and accordingly, dedicated bogies are typically used to correspond to multiple types of vehicles.

Recently, it has been attempted to develop a universal bogie that has capabilities of varying a position in the vehicle width direction, a position in the vehicle length direction, and a position in the vehicle height direction of a supporting portion that supports the vehicle body lower portion, to be capable of transferring the vehicle bodies of multiple types of vehicles.

Such a universal bogie is supposed to be equipped with a vehicle type conversion device (frequently called a "windmill" by a person skilled in the art) that is typically operated a motor or a pneumatic or hydraulic pressure, in order to vary the position of the supporting portion that supports the vehicle body lower portion.

Therefore, according to the conventional art, it is disadvantageous in terms of facility investment cost, such as an increase in the manufacturing cost of the universal bogie, and maintenance of the vehicle type conversion device may be difficult.

The above information disclosed in this Background section is only for enhancement of understanding of the background of the disclosure, and therefore it may contain information that does not form the prior art that is already known in this country to a person of ordinary skill in the art.

SUMMARY

The present disclosure provides an apparatus for supporting a vehicle body during assembly, capable of manually varying a position of a supporting point for supporting and holding a vehicle body lower portion according to a vehicle type of the vehicle body, in a vehicle body assembling line for assembling vehicle bodies of multiple types of vehicles accompanied by a worker.

An apparatus for supporting a vehicle body in assembling includes a support frame, at least one first vehicle body supporting portion installed on a front portion of the support frame to be movable in a vehicle width direction, at least one first position adjustment unit installed on the front portion of the support frame and configured to manually vary a position of a corresponding first vehicle body supporting portion, at least one second vehicle body supporting portion installed on a rear portion of the support frame to be capable of clamping, and at least one second position adjustment unit installed on the rear portion of the support frame and configured to manually vary a position in a vehicle length direction of a corresponding second vehicle body supporting portion.

An exemplary apparatus may further include at least one third vehicle body supporting portion installed on a center portion of the support frame to be movable in a vehicle height direction, and at least one third position adjustment unit installed on the center portion of the support frame and configured to manually vary a position of a corresponding third vehicle body supporting portion.

The support frame may include at least one first mount member disposed in the vehicle width direction in the front portion of the support frame.

The at least one first vehicle body supporting portion may be disposed on both sides in the vehicle width direction of the at least one first mount member, respectively.

The at least one first position adjustment unit may be installed on the at least one first mount member.

The support frame may include at least one second mount member disposed in the vehicle width direction in the rear portion of the support frame.

The at least one second vehicle body supporting portion may be disposed on both sides in the vehicle width direction of the at least one second mount member, respectively.

The at least one second position adjustment unit may be installed on the at least one second mount member.

The support frame may include a plurality of third mount members disposed on a center portion of the support frame.

The at least one third vehicle body supporting portion may be disposed on each of the plurality of third mount members.

The at least one third position adjustment unit may be installed on each of the plurality of third mount members.

The at least one first position adjustment unit may include a first rotation plate installed on the front portion of the support frame to be rotatable by a preset rotation angle, and a plurality of first positioners having different lengths in the vehicle width direction, installed on an edge portion of the first rotation plate with a spacing corresponding to a rotation angle of the first rotation plate, and selectively coupled to the at least one first vehicle body supporting portion.

The at least one first position adjustment unit may further include a first fixed bracket fixed to the front portion of the support frame and rotatably coupled to the first rotation plate through a first handle, a fixing pin configured to selectively couple the at least one first vehicle body supporting portion and each of the plurality of first positioners, and at least one first stopper installed on the first fixed bracket and configured to fix the first rotation plate for each rotation angle.

Each of the plurality of first positioners may include a first pin engagement hole capable of being coupled by the fixing pin.

The at least one first vehicle body supporting portion may include a coupling block selectively coupled to each of the plurality of first positioners through the fixing pin, and formed with a second pin engagement hole connectable to the first pin engagement hole.

Each of the plurality of first positioners may be provided in a fork shape capable of coupling to the coupling block.

The at least one first stopper may include a first stopper body fixed to the first fixed bracket, and a first ball elastically supported by the first stopper body through a first spring, and coupled to a plurality of first stopping holes formed on the first rotation plate with a preset spacing.

The at least one first vehicle body supporting portion may include a first rail block disposed on the front portion of the support frame in the vehicle width direction, a first moving block coupled to the first rail block to be slidable in the vehicle width direction, a first support block provided on a first mounting bracket fixed to the first moving block and configured to support a vehicle body lower portion, a first support pin provided on the first support block and configured to be inserted into at least one first tooling hole formed in the vehicle body lower portion, and a coupling block fixed to the first mounting bracket and coupled to the at least one first position adjustment unit.

The at least one second position adjustment unit may include at least one positioning block disposed along the vehicle length direction on the rear portion of the support frame, and a plurality of positioning pins installed on the at least one positioning block such that the at least one second vehicle body supporting portion may be attached and detached along the vehicle length direction.

The at least one second vehicle body supporting portion may include a second mounting bracket provided with a plurality of bush members capable of fitting with the plurality of positioning pins, a second support block provided on the second mounting bracket and configured to support a vehicle body lower portion, a second support pin provided on the second support block and configured to be inserted into at least one second tooling hole formed in the vehicle body lower portion, and at least one toggle clamper Installed on the rear portion of the support frame and configured to clamp the second mounting bracket.

Each of the at least one third position adjustment unit may include a second rotation plate installed on the center portion of the support frame to be rotatable by a preset rotation angle, and a plurality of second positioners having different lengths in the vehicle height direction, installed on an edge portion of the second rotation plate with a spacing corresponding to a rotation angle of the second rotation plate, and selectively coupled to the at least one third vehicle body supporting portion.

The at least one third position adjustment unit may further include a second fixed bracket fixed to the center portion of the support frame and rotatably coupled to the second rotation plate through a second handle, and at least one second stopper installed on the second fixed bracket and configured to fix the second rotation plate for each rotation angle.

The at least one third vehicle body supporting portion may include a locator provided to be movable in the vehicle height direction, and formed with a coupling groove capable of selectively coupling to each of the plurality of second positioners.

The at least one second stopper may include a second stopper body fixed to the second fixed bracket, and a second ball elastically supported by the second stopper body through a second spring, and coupled to a plurality of second stopping holes formed on the second rotation plate with a preset spacing.

The at least one third vehicle body supporting portion may include a second rail block disposed in the vehicle height direction on the center portion of the support frame, a second moving block coupled to the second rail block to be slidable in the vehicle height direction, and a locator coupled to a third mounting bracket fixed to the second moving block to support a vehicle body lower portion, and coupled to the at least one third position adjustment unit.

According to an exemplary apparatus for supporting a vehicle body in assembling, a vehicle type conversion device operated by a motor, or a pneumatic or hydraulic pressure in the conventional art may be removed, and it is possible to reduce the weight of the vehicle body support equipment and simplify the structure, and reduce the facility investment cost.

Other effects that may be obtained or are predicted by an exemplary embodiment will be explicitly or implicitly described in a detailed description of the present disclosure. That is, various effects that are predicted according to an exemplary embodiment will be described in the following detailed description.

BRIEF DESCRIPTION OF THE FIGURES

The drawings are intended to be used as references for describing the exemplary embodiments of the present disclosure, and the accompanying drawings should not be construed as limiting the technical spirit of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

The terminology used herein is for the purpose of describing particular embodiments only and is not intended to be limiting of the present disclosure. As used herein, the singular forms are intended to include the plural forms as well, unless the context clearly indicates otherwise.

As used herein, the term "comprises" and/or "comprising" refers to the presence of specified features, integers, steps, acts, elements and/or components, but it should also be understood that it does not exclude a presence or an addition of one or more other features, integers, steps, acts, components, and/or groups thereof. As used herein, the term "and/or" includes any one or all combinations of one or more related items.

The term "coupled" denotes a physical relationship between two components in which components are directly connected to each other or indirectly through one or more intermediary components.

The terms "vehicle", "of a vehicle", "automobile" or other similar terms used herein are generally used to cover various vehicles such as passenger vehicles including sports cars, sport utility vehicles (SUVs), buses, trucks, commercial vehicles, and the like, and cover hybrid vehicles, electric vehicles, hybrid electric vehicles, fuel cell electric vehicles, and other alternative fuel vehicles (i.e., vehicles driven by a fuel derived from resources other than petroleum).

Hereinafter, an example of the present disclosure is described in detail with reference to the accompanying drawing.

Figure 1:
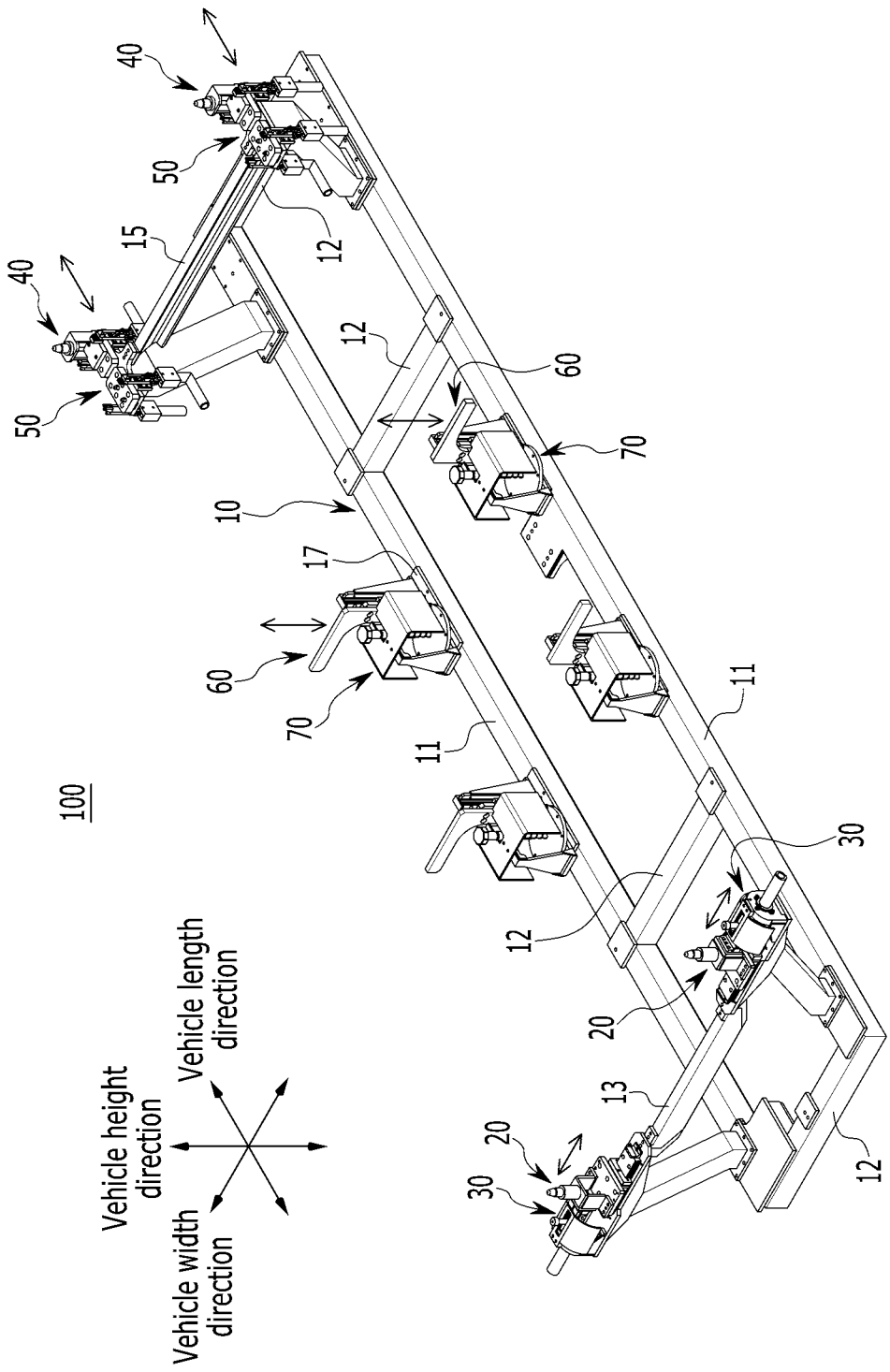
FIG. 1 is a perspective view illustrating an apparatus for supporting a vehicle body during assembly according to an embodiment.
Figure 2:
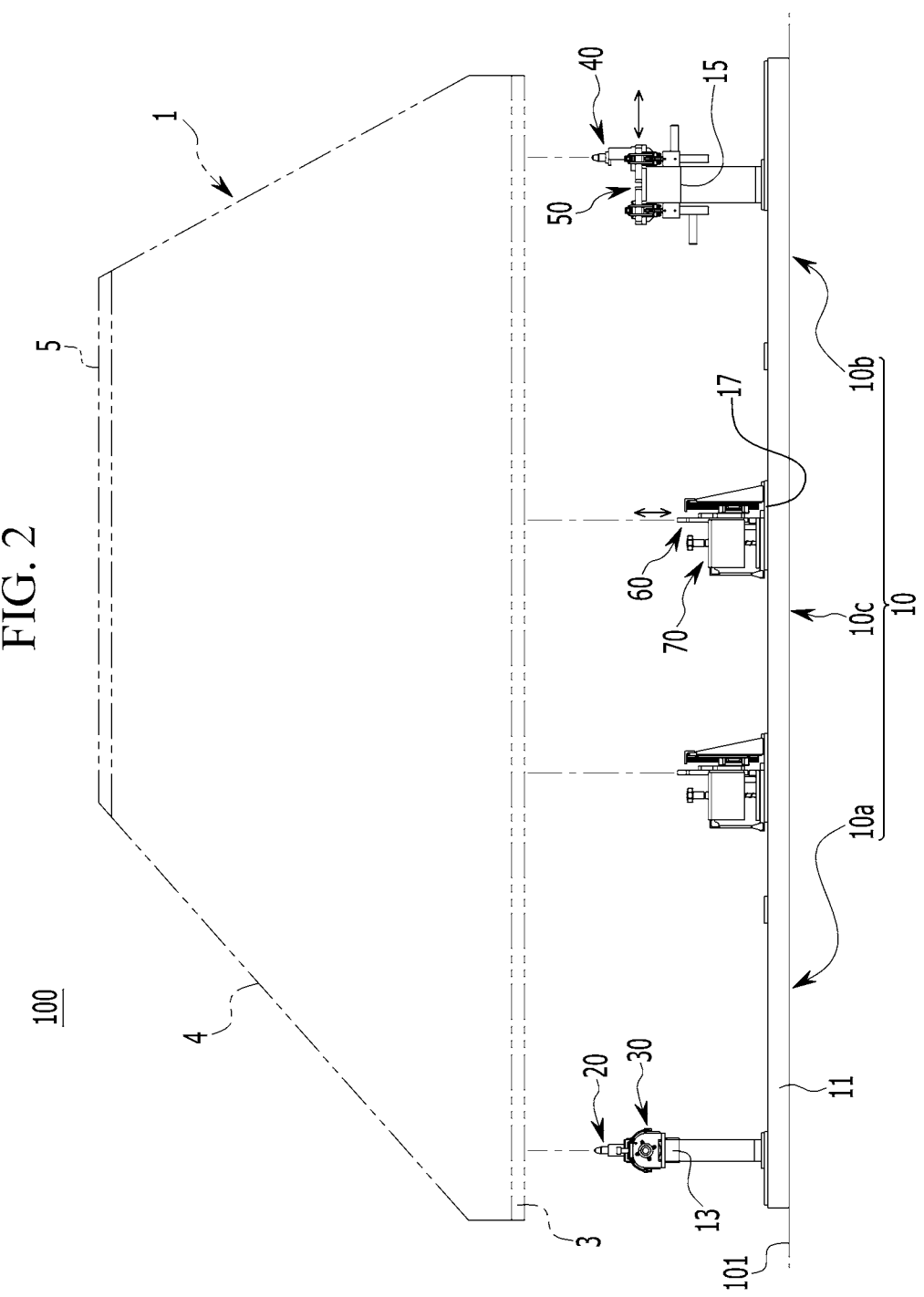
FIG. 2 is a lateral view illustrating an apparatus for supporting a vehicle body during assembly according to an embodiment.
Figure 3:
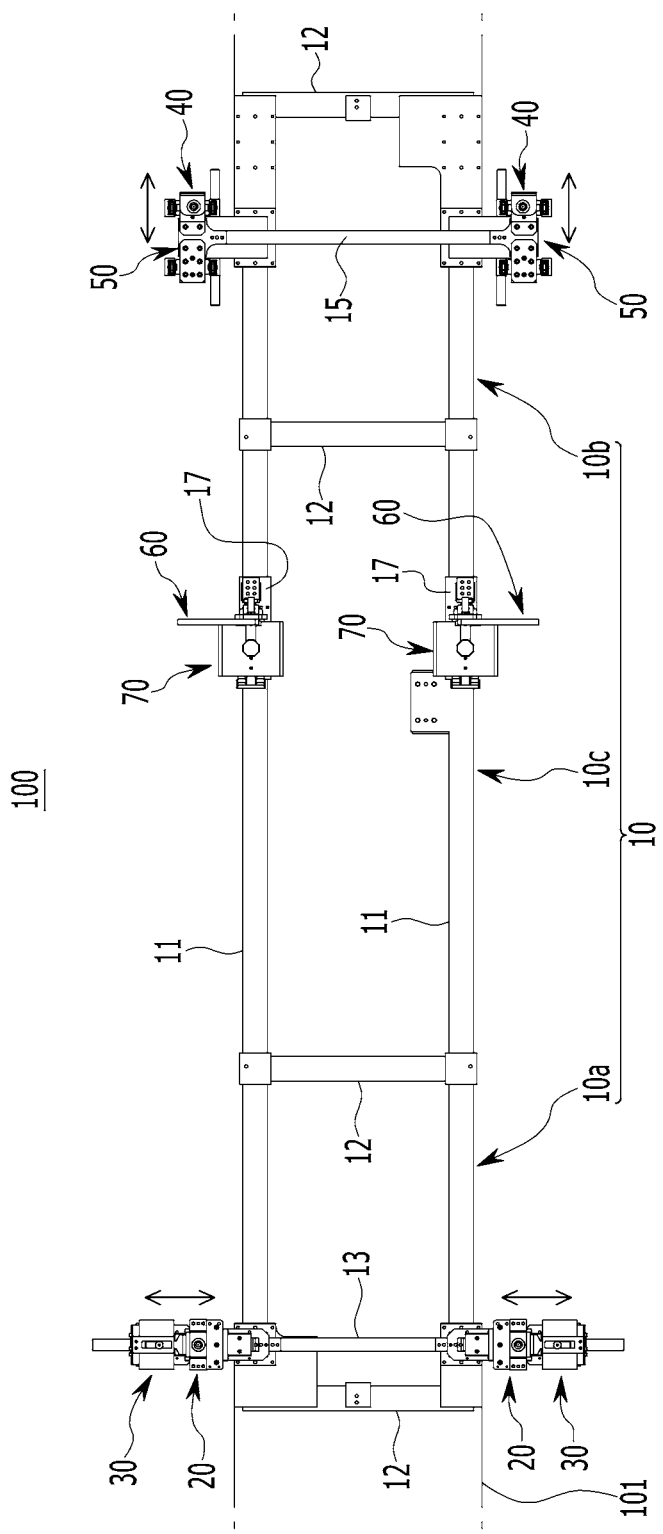
FIG. 3 is a top plan view illustrating an apparatus for supporting a vehicle body during assembly according to an embodiment.
Figure 4A:
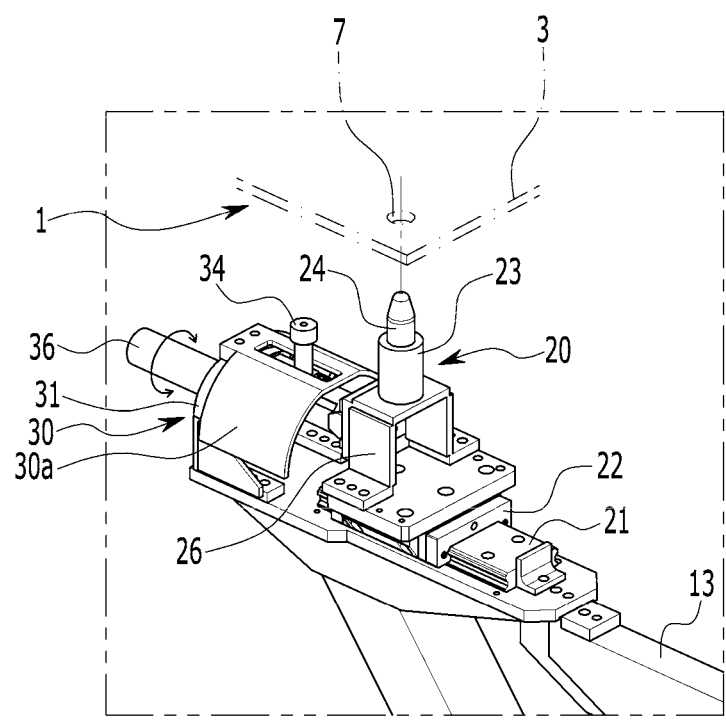
FIGS. 4A and 4B, 5, 6, 7A, and 7B illustrate at least one first vehicle body supporting portion and at least one first position adjustment unit applied to an apparatus for supporting a vehicle body during assembly according to an embodiment.
Figure 4B:
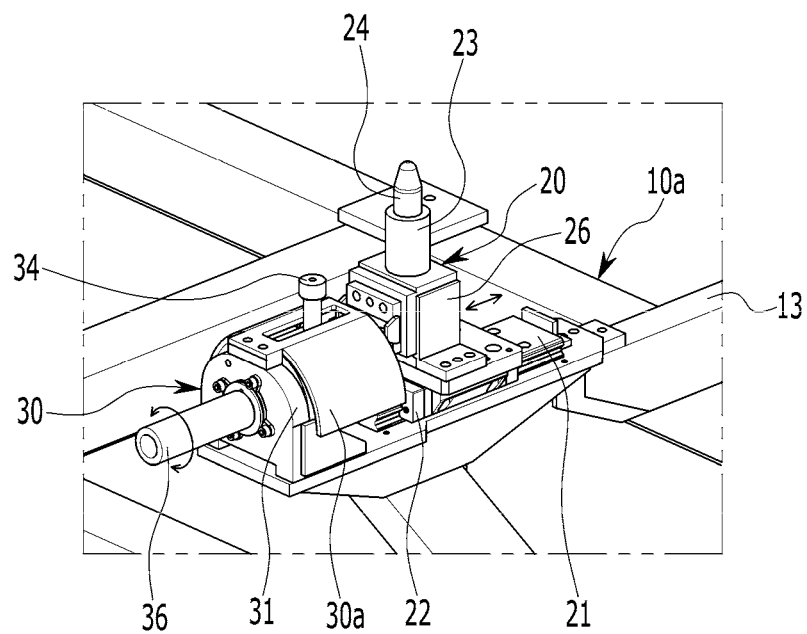
Figure 5:
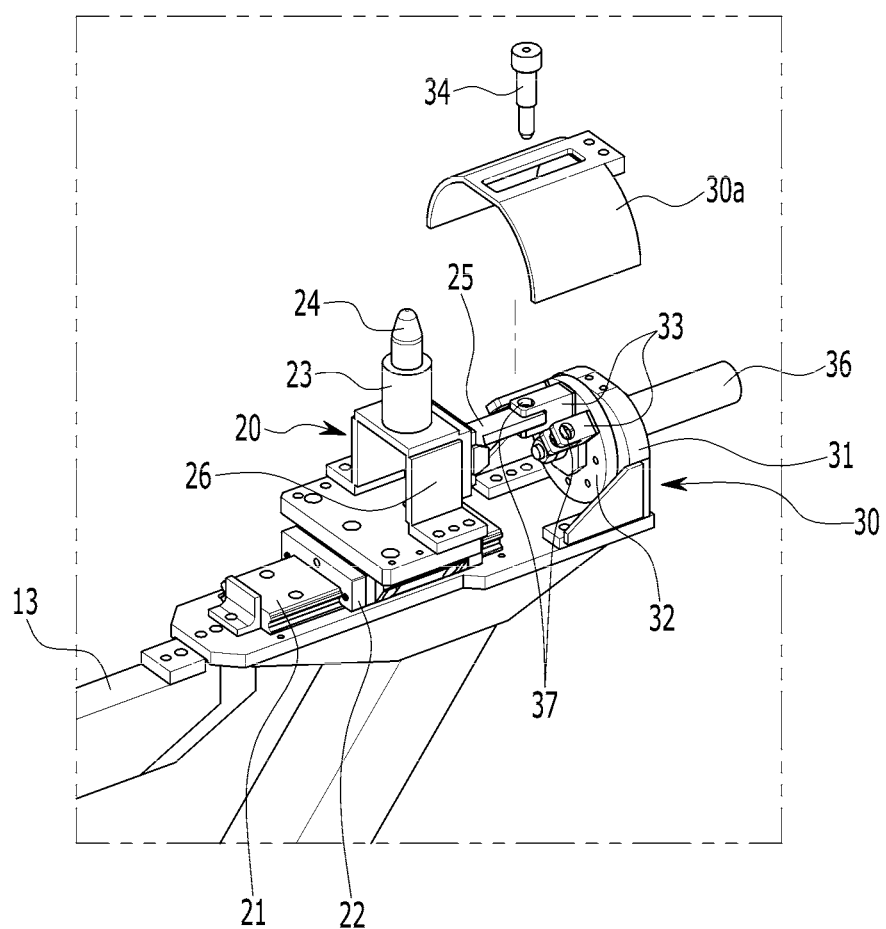
Figure 6:
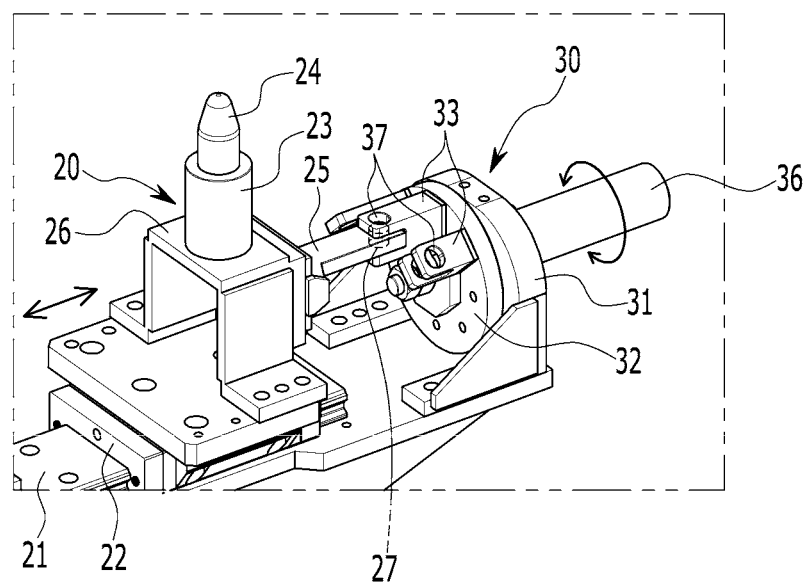
Figure 7A:
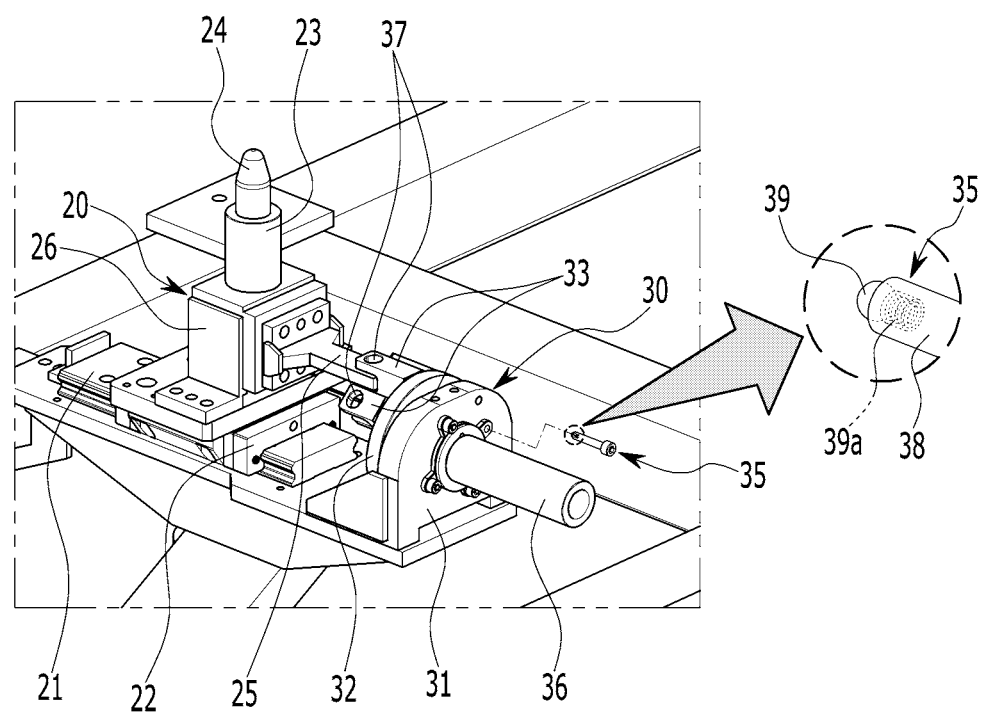
Figure 7B:
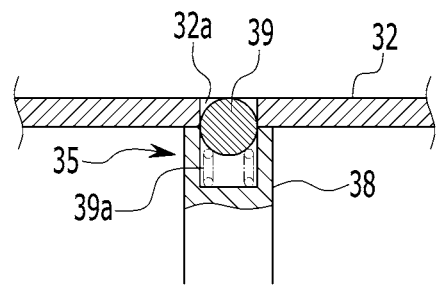

Referring to FIG. 1 to FIG. 3, an apparatus 100 for supporting a vehicle body during assembly according to an embodiment may be applicable to, in a vehicle production factory, a vehicle body assembling line for manufacturing a vehicle body 1 in the body-in-white (BIW) form by assembling a plurality of vehicle body component parts.

Here, the plurality of vehicle body component parts may include a floor assembly (hereinafter, called a vehicle body lower portion) 3, a side assembly 4 assembled to the vehicle body lower portion 3, and a roof assembly 5 assembled to the side assembly 4.

The process of assembling the side assembly 4 to the vehicle body lower portion 3 and assembling the roof assembly 5 to the side assembly 4 is frequently called a body-build process or a buck process by a person skilled in the art.

In the body-build process or the buck process of the vehicle body assembling line, the side assembly 4 is welded to the vehicle body lower portion 3, and the roof assembly 5 is welded to the side assembly 4, by a welding robot.

In the vehicle body assembling line, the vehicle body component parts may be welded on the apparatus 100 for supporting a vehicle body during assembly according to an embodiment, by the welding robot.

The apparatus 100 for supporting a vehicle body in assembling according to an embodiment may be transferred to a plurality of welding processes along preset path by a transport system 101 (frequently called a bogie system by a person skilled in the art) that includes a conveyor, a transfer rail, and a shuttle apparatus that are well-known to a person skilled in the art.

However, the apparatus 100 for supporting a vehicle body during assembly according to an embodiment is not limited to be transferred by the transport system 101 while supporting the vehicle body 1, and it may be understood that the apparatus 100 may be formed in a jig device type fixed to a process floor and support the vehicle body 1.

In this disclosure, with reference to the drawing, a back and forth direction is called a vehicle length direction, a left-and-right direction is called a vehicle width direction, and a vertical direction is called a vehicle height direction.

Furthermore, in this specification, "upper end portion", "upper portion", "upper end", or "upper portion surface" of a component indicates end portion, portion, end, or surface of the component that is relatively positioned higher in the drawing, and "lower end portion", "lower portion", "lower end", or "lower portion surface" of a component indicates end portion, portion, end, or surface of the component that is relatively positioned lower in the drawing.

In addition, in this specification, "end" (for example, one end, another end, or the like) of a component indicates an end of the component in any direction, and "end portion" (for example, one end portion, another end portion, or the like) of a component indicates a certain part of the component including the end.

The apparatus 100 for supporting a vehicle body during assembly according to an embodiment is structured such that, in a vehicle body assembling line for assembling the vehicle body 1 of multiple types of vehicles accompanied by a worker, a position of a supporting point for supporting and holding the vehicle body lower portion 3 for multiple types of vehicles is manually varied.

For such a purpose, the apparatus 100 for supporting a vehicle body during assembly according to an embodiment includes a support frame 10, at least one first vehicle body supporting portion 20, at least one first position adjustment unit 30, at least one second vehicle body supporting portion 40, at least one second position adjustment unit 50, at least one third vehicle body supporting portion 60, and at least one third position adjustment unit 70.

In an embodiment, the support frame 10 is configured to support constituent elements described below. For such a purpose, the support frame 10 is provided with accessory elements such as various brackets, blocks, plates, housings, covers, collars.

However, since the accessory elements are for installing the constituent elements to the frame, in an embodiment, the accessory elements are collectively referred to as the support frame 10, except for exceptional cases.

In an example, the support frame 10 may be a bogie frame transferred along a preset path by the transport system 101, or a jig frame fixed to the process floor. However, hereinafter, the support frame 10 will be described by taking an example of a bogie frame transferred along a preset path by the transport system 101.

The support frame 10 includes an at least one pair of first frames 11 and at least one pair of second frames 12.

The at least one pair of first frames 11 is disposed in the vehicle length direction with a preset spacing.

The at least one pair of second frames 12 is disposed in the vehicle length direction with a preset spacing. The at least one pair of second frames 12 interconnects the at least one pair of first frames 11 in the vehicle width direction (i.e., in a transverse direction).

In an example, the at least one pair of second frames 12 may be four. A first pair of the four second frames 12 is disposed on an end of a front portion and an end of a rear portion of the at least one pair of first frames 11, respectively. In addition, a second pair of the four second frames 12 are disposed, with a preset spacing, between a front portion and a rear portion of the at least one pair of first frames 11.

In this disclosure, a space between the second pair of second frames 12 may be referred to as a center portion of the support frame 10. That is, the support frame 10 may include a front portion 10a, a rear portion 10b, and a center portion 10c.

In an embodiment, the at least one first vehicle body supporting portion 20 is configured to support a front portion of the vehicle body lower portion 3. The at least one first vehicle body supporting portion 20 is installed on the front portion 10a of the support frame 10 to be movable in the vehicle width direction.

Here, the at least one first vehicle body supporting portion 20 is mounted on at least one first mount member 13 disposed the front portion 10a of the support frame 10 in the vehicle width direction. Furthermore, the at least one first vehicle body supporting portion 20 is disposed on both sides in the vehicle width direction of the at least one first mount member 13, respectively.

FIG. 4 to FIG. 7 illustrate at least one first vehicle body supporting portion and at least one first position adjustment unit applied to an apparatus for supporting a vehicle body during assembly according to an embodiment.

Referring to FIG. 1 to FIG. 7, the at least one first vehicle body supporting portion 20 according to an embodiment includes a first rail block 21, a first moving block 22, a first support block 23, a first support pin 24, and a coupling block 25.

The first rail block 21 is fixed to the at least one first mount member 13, and disposed in the vehicle width direction. The first moving block 22 is coupled to the first rail block 21 to be slidable in the vehicle width direction.

The first support block 23 is configured to support the front portion of the vehicle body lower portion 3. The first support block 23 is coupled to a first mounting bracket 26 fixed to the first moving block 22. The first support block 23 is coupled to an upper surface of the first mounting bracket 26 and extends upward.

The first support pin 24 is provided as a reference pin or a tooling pin that is fitted in the vehicle height direction into at least one first tooling hole 7 formed in the front portion of the vehicle body lower portion 3. The first support pin 24 is provided on the first support block 23. The first support pin 24 is coupled to an upper surface of the first support block 23 and extends upward.

In addition, the coupling block 25 is configured to be coupled to the at least one first position adjustment unit 30 that is further described later. The coupling block 25 is fixed to the first mounting bracket 26, and is disposed in the vehicle width direction.

Referring to FIG. 1 to FIG. 7, in an embodiment, each of the at least one first position adjustment unit 30 is configured to manually vary a position in the vehicle width direction of a corresponding first vehicle body supporting portion 20.

The at least one first position adjustment unit 30 is installed on the front portion 10a of the support frame 10. The at least one first position adjustment unit 30 is respectively installed on both sides in the vehicle width direction of the at least one first mount member 13. Each of the at least one first position adjustment unit 30 may be coupled to the corresponding first vehicle body supporting portion 20.

The at least one first position adjustment unit 30 according to an embodiment includes a first fixed bracket 31, a first rotation plate 32, a plurality of first positioners 33, a fixing pin 34, and at least one first stopper 35.

The first fixed bracket 31 is fixed to the at least one first mount member 13, in the front portion 10a of the support frame 10.

The first rotation plate 32 is rotatably installed on the first fixed bracket 31, provided in a disk shape, and disposed in the vehicle width direction. The first rotation plate 32 is coupled to the first fixed bracket 31 to be rotatable in the vehicle length direction through a first handle 36 extended in the vehicle width direction.

Here, the first rotation plate 32 is coupled to the first fixed bracket 31 to be rotatable by a preset rotation angle. In an example, the first rotation plate 32 may be rotated by 45 degrees.

Each of the plurality of first positioners 33 is provided as a position adjust block configured to substantially adjust a position in the vehicle width direction of the corresponding first vehicle body supporting portion 20.

The plurality of first positioners 33 are installed on an edge portion of the first rotation plate 32 with a spacing corresponding to a rotation angle of the first rotation plate 32. The plurality of first positioners 33 have different lengths depending on the vehicle type of the vehicle body 1, and are disposed in the vehicle width direction.

Each of the plurality of first positioners 33 may be selectively coupled to the corresponding first vehicle body supporting portion 20. In an example, the number of the plurality of first positioners 33 may be eight. However, it may be understood that only three first positioners 33 are shown in the drawing for illustrational convenience. The eight first positioners 33 are disposed to be spaced apart from each other on the edge portion of the first rotation plate 32 by a preset spacing corresponding to a rotation angle (for example, 45 degrees) of the first rotation plate 32.

Here, the plurality of first positioners 33 may be provided in a fork shape capable of selectively coupling to the coupling block 25 of the at least one first vehicle body supporting portion 20. In addition, a first pin engagement hole 37 is formed in each of the plurality of first positioners 33, for coupling to the coupling block 25. Furthermore, the coupling block 25 includes a second pin engagement hole 27 connected to the first pin engagement hole 37.

The fixing pin 34 is configured to selectively couple (e.g., fix) the coupling block 25 to each of the plurality of first positioners 33. Each of the plurality of first positioners 33 is fitted to the coupling block 25 in the fork shape, and the fixing pin 34 is coupled to the first pin engagement hole 37 and the second pin engagement hole 27 that are interconnected.

The at least one first stopper 35 is configured to fix the first rotation plate 32 for each rotation angle. The at least one first stopper 35 is installed on the first fixed bracket 31. The at least one first stopper 35 includes a first stopper body 38 and a first ball 39.

The first stopper body 38 is fixed to the first fixed bracket 31 along the vehicle width direction. In an example, the first stopper body 38 may be provided in a bolt rod shape including a head and a shank that are interconnected with each other.

The first ball 39 is elastically supported at an end portion of the shank of the first stopper body 38 through a first spring 39a. The first ball 39 may be selectively coupled to a plurality of first stopping holes 32a formed on the first rotation plate 32 by a preset spacing.

A not-yet described reference numeral 30a in the drawing denotes a first cover coupled to an upper portion of the first fixed bracket 31.

Referring to FIG. 1 to FIG. 3, in an embodiment, the at least one second vehicle body supporting portion 40 is configured to support a rear portion of the vehicle body lower portion 3. The at least one second vehicle body supporting portion 40 is installed on the rear portion 10b of the support frame 10 to be capable of clamping.

Here, the at least one second vehicle body supporting portion 40 is mounted on at least one second mount member 15 disposed on the rear portion 10b of the support frame 10 in the vehicle width direction. Here, the at least one second vehicle body support part 40 is mounted to the at least one second mounting member 15 disposed on the rear part 10b of the support frame 10 in the vehicle width direction. Furthermore, the at least one second vehicle body supporting portion 40 is disposed on both sides in the vehicle width direction of the at least one second mount member 15, respectively.

Figure 8:
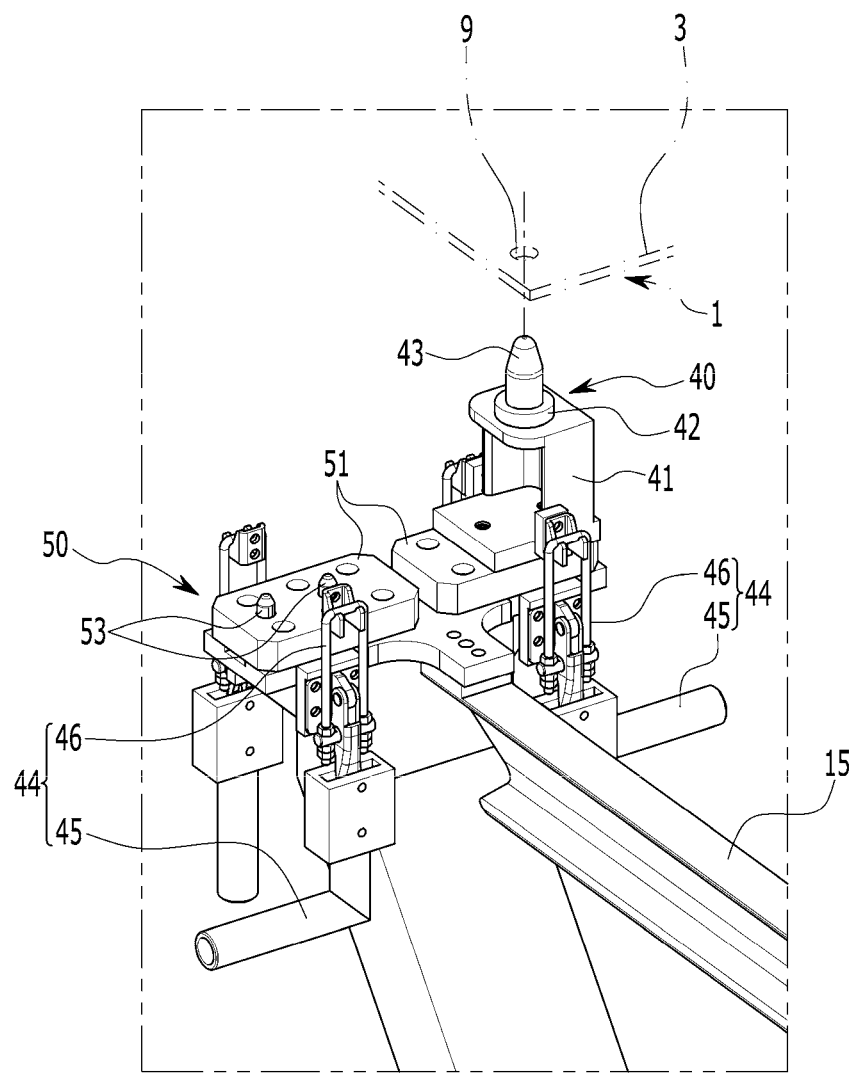
FIG. 8 and FIG. 9 illustrate at least one second vehicle body supporting portion and at least one second position adjustment unit applied to an apparatus for supporting a vehicle body during assembly according to an embodiment.
Figure 9:
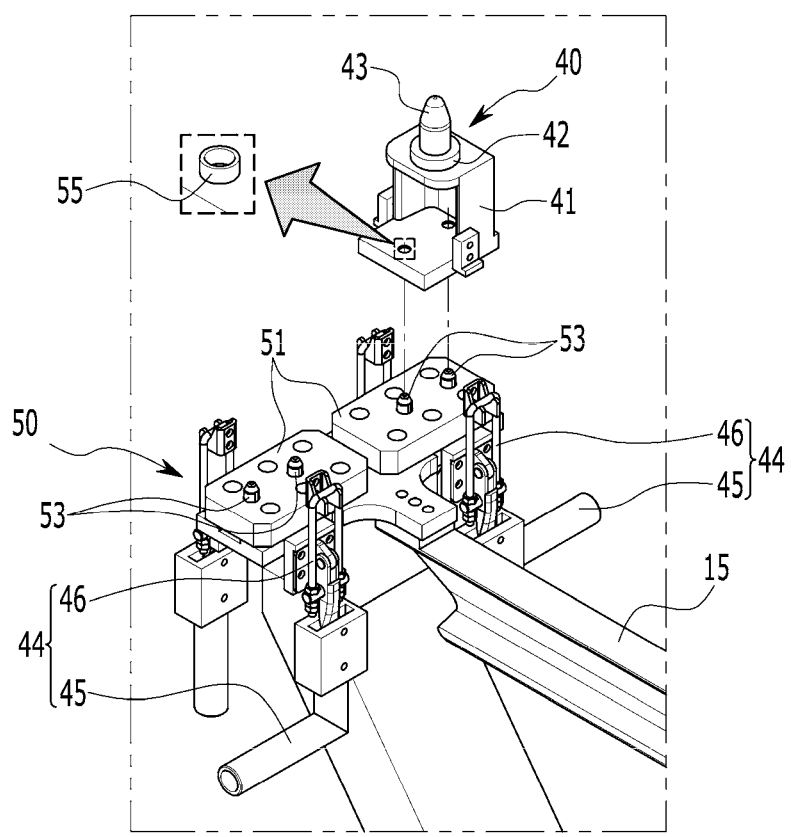
Figure 10:
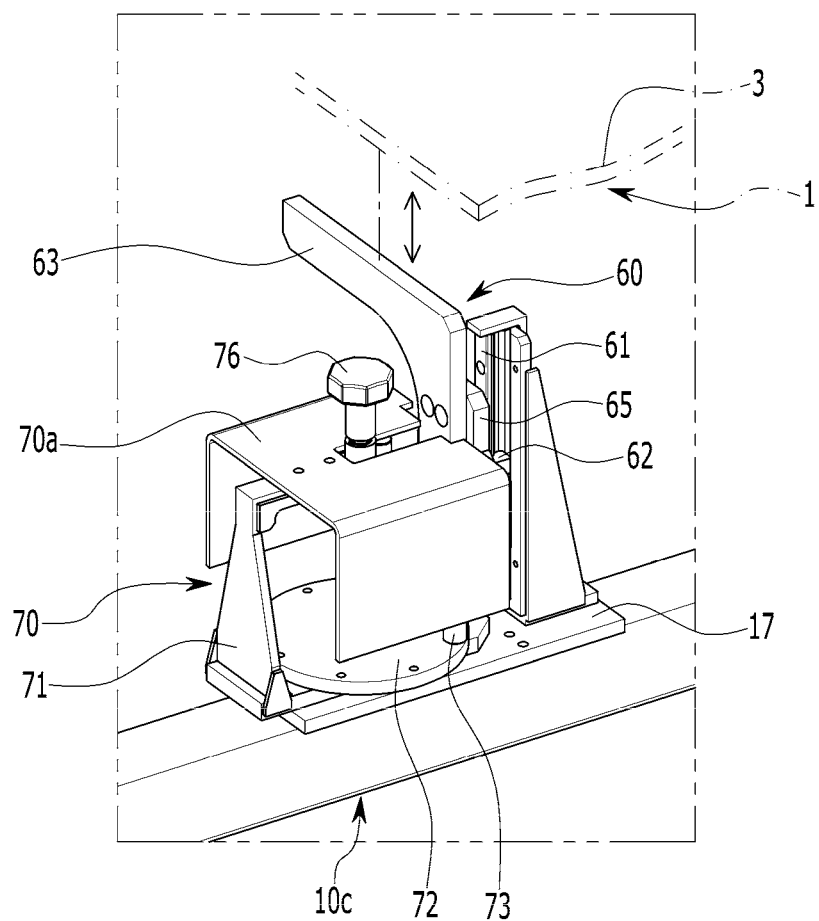
FIGS. 10, 11, 12, 13A, and 13B illustrate at least one third vehicle body supporting portion and at least one third position adjustment unit applied to an apparatus for supporting a vehicle body during assembly according to an embodiment.
Figure 11:
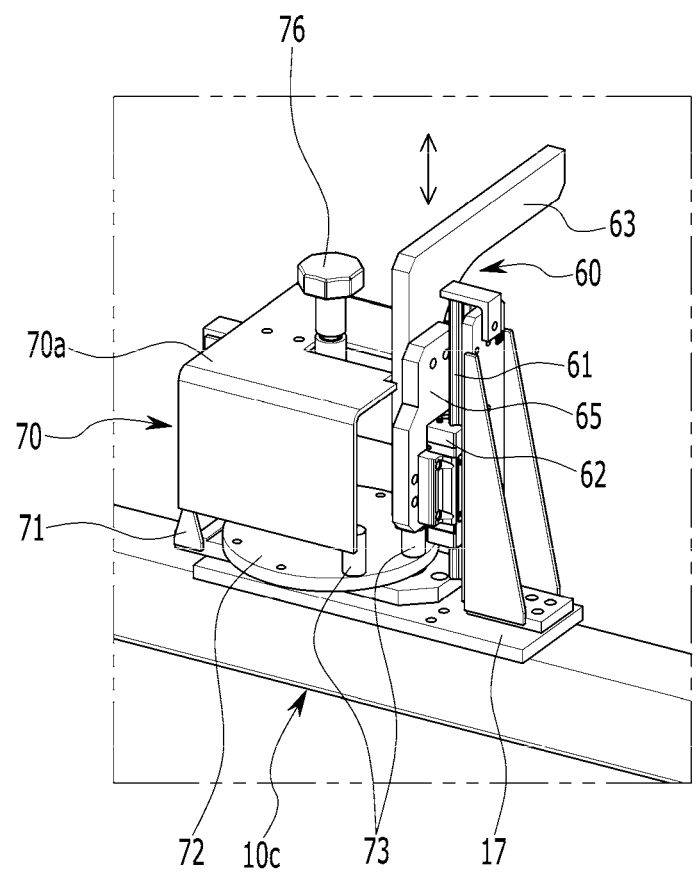
Figure 12:
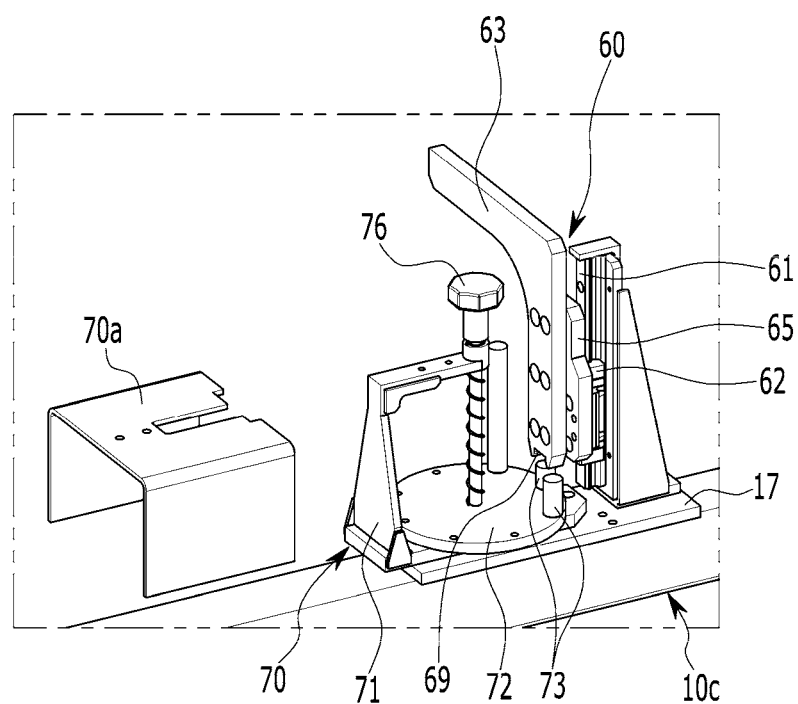
Figure 13A:
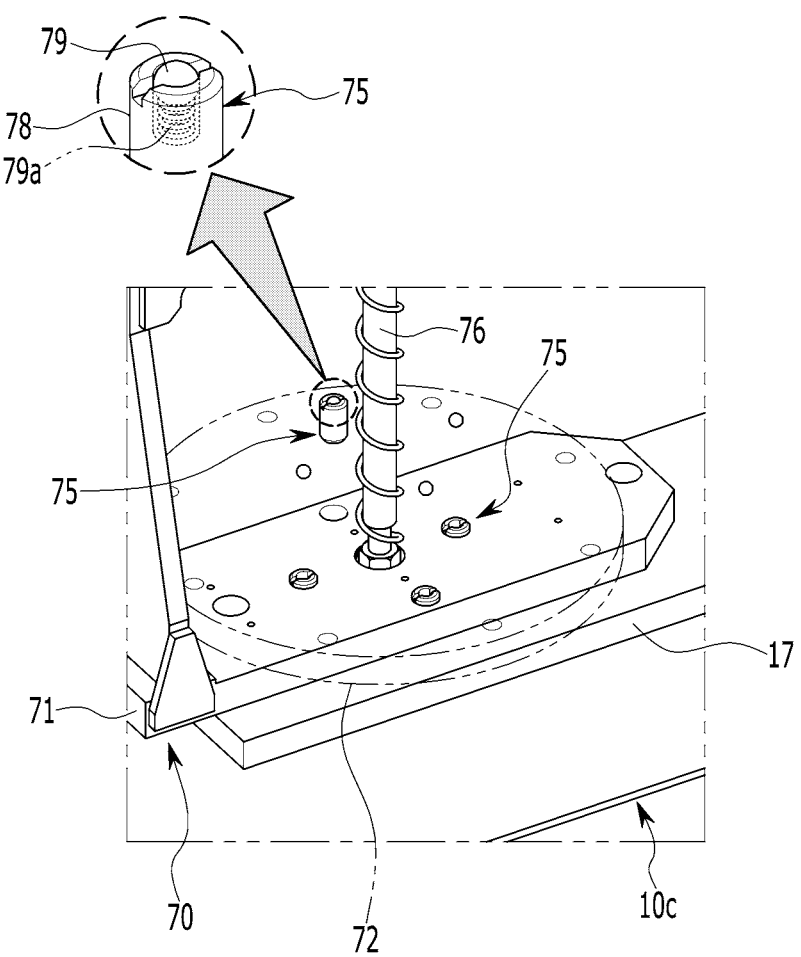
Figure 13B:
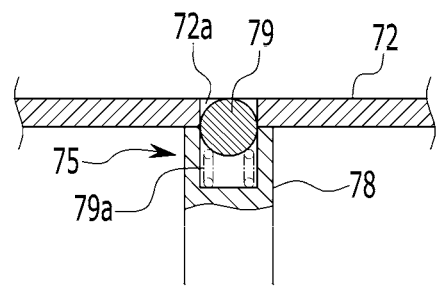

FIG. 8 and FIG. 9 illustrate at least one second vehicle body supporting portion and at least one second position adjustment unit applied to an apparatus for supporting a vehicle body during assembly according to an embodiment.

Referring to FIG. 8 and FIG. 9, the at least one second vehicle body supporting portion 40 according to an embodiment includes a second mounting bracket 41, a second support block 42, a second support pin 43, and at least one toggle clamper 44.

The second mounting bracket 41 is provided as a base member for mounting the second support block 42 and the second support pin 43, which is further described later.

The second support block 42 is configured to support the rear portion of the vehicle body lower portion 3. The second support block 42 is coupled to on the second mounting bracket 41. The second support block 42 is coupled to an upper surface of the second mounting bracket 41 and extends upward.

The second support pin 43 is provided as a reference pin or a tooling pin that is fitted in the vehicle body height direction into at least one second tooling hole 9 formed in the rear portion of the vehicle body lower portion 3. The second support pin 43 is provided on the second support block 42. The second support pin 43 is coupled to an upper surface of the second support block 42 and extends upward.

In addition, the at least one toggle clamper 44 is configured to clamp the second mounting bracket 41 to the at least one second mount member 15, in the rear portion 10b of the support frame 10. The at least one toggle clamper 44 is installed on the at least one second mount member 15.

In an example, the at least one toggle clamper 44 may include four toggle clampers. In the at least one second mount member 15, two of the four toggle clampers 44 are disposed in a front portion to face each other along the vehicle width direction, and remaining two toggle clampers 44 are disposed in a rear portion to face each other along the vehicle width direction.

The at least one toggle clamper 44 is configured to fix the second mounting bracket 41 to the at least one second mount member 15 through a clamping portion 46 in a ring shape pulled by a rotation of a handle portion 45. The at least one toggle clamper 44 is known to a person skilled in the art, and is not described in further detail.

The clamping portion is pulled by the rotation of the handle portion 45.

Referring to FIG. 1 to FIG. 3, in an embodiment, each of the at least one second position adjustment unit 50 is configured to manually vary a position in the vehicle length direction of a corresponding second vehicle body supporting portion 40.

The at least one second position adjustment unit 50 is installed on the rear portion 10b of the support frame 10. The at least one second position adjustment unit 50 is respectively installed on both sides in the vehicle width direction of the at least one second mount member 15. Each of the at least one second position adjustment unit 50 may be coupled to the corresponding second vehicle body supporting portion 40.

Referring to FIG. 8 and FIG. 9, the at least one second position adjustment unit 50 according to an embodiment includes at least one positioning block 51 and a plurality of positioning pins 53.

The at least one positioning block 51 is disposed along a longitudinal direction on both sides in the vehicle width direction of the at least one second mount member 15. In an example, the at least one positioning block 51 is provided as a pair spaced apart from each other in the vehicle length direction, and is fixed to the at least one second mount member 15.

The plurality of positioning pins 53 are configured to determine a position in the vehicle length direction of the at least one second vehicle body supporting portion 40. The plurality of positioning pins 53 are installed on the at least one positioning block 51 in the vehicle height direction, and may be coupled to the second mounting bracket 41 of the at least one second vehicle body supporting portion 40.

Here, the second mounting bracket 41 of the at least one second vehicle body supporting portion 40 may be mounted on or detached from the plurality of positioning pins 53 along the vehicle length direction.

Furthermore, the second mounting bracket 41 of the at least one second vehicle body supporting portion 40 is coupled with a plurality of bush members 55 into which the plurality of positioning pins 53 may be inserted along the vehicle height direction.

Referring to FIG. 1 to FIG. 3, in an embodiment, the at least one third vehicle body supporting portion 60 is configured to support a center portion of the vehicle body lower portion 3. The at least one third vehicle body supporting portion 60 is installed on the center portion 10c of the support frame 10 to be movable in the vehicle height direction.

Here, the at least one third vehicle body supporting portion 60 is mounted on a plurality of third mount members 17 disposed on the center portion 10c of the support frame 10. Furthermore, the at least one third vehicle body supporting portion 60 is disposed on each of the plurality of third mount members 17.

FIG. 10 to FIG. 13 illustrate at least one third vehicle body supporting portion and at least one third position adjustment unit applied to an apparatus for supporting a vehicle body in assembling according to an exemplary embodiment.

Referring to FIG. 10 to FIG. 13, the at least one third vehicle body supporting portion 60 according to an exemplary embodiment includes a second rail block 61, a second moving block 62, and a locator 63.

The second rail block 61 is fixed to each of the plurality of third mount members 17, and is disposed in the vehicle height direction. The second moving block 62 is coupled to the second rail block 61 to be slidable in the vehicle height direction.

The locator 63 is configured to support the center portion of the vehicle body lower portion 3. In addition, the locator 63 is configured to be coupled to the at least one third position adjustment unit 70 that is further described later.

The locator 63 is coupled to a third mounting bracket 65 fixed to the second moving block 62. In an example, the locator 63 is provided in a form extending in the vehicle height direction from the portion extending in the vehicle width direction.

Referring to FIG. 1 to FIG. 3, in an exemplary embodiment, each of the at least one third position adjustment unit 70 is configured to manually vary a position in the vehicle height direction of a corresponding third vehicle body supporting portion 60.

The at least one third position adjustment unit 70 is installed on the center portion 10c of the support frame 10. The at least one third position adjustment unit 70 is installed on each of the plurality of third mount members 17. Each of the at least one third position adjustment unit 70 may be coupled to the corresponding third vehicle body supporting portion 60.

Referring to FIG. 10 to FIG. 13, the at least one third position adjustment unit 70 according to an exemplary embodiment includes a second fixed bracket 71, a second rotation plate 72, a plurality of second positioners 73, and at least one second stopper 75.

The second fixed bracket 71 is fixed to each of the plurality of third mount members 17, in the center portion 10c of the support frame 10.

The second rotation plate 72 is rotatably installed on the second fixed bracket 71, provided in a disk shape, and disposed in the vehicle height direction. The second rotation plate 72 is rotatably coupled to a bottom surface of the second fixed bracket 71 in the vehicle length direction through a second handle 76 extended in the vehicle height direction.

Here, the second rotation plate 72 is rotatably coupled to the second fixed bracket 71 by a preset rotation angle. In an example, the second rotation plate 72 may be rotated by 45 degrees.

Each of the plurality of second positioners 73 is provided as a position adjust block configured to substantially adjust a position in the vehicle height direction of the corresponding third vehicle body supporting portion 60.

The plurality of second positioners 73 are installed on an edge portion of the second rotation plate 72 with a spacing corresponding to a rotation angle of the second rotation plate 72. The plurality of second positioners 73 have different lengths depending on the vehicle type of the vehicle body 1, and are disposed in the vehicle height direction.

Each of the plurality of second positioners 73 may be selectively coupled to the corresponding third vehicle body supporting portion 60. In an example, the plurality of second positioners 73 may be eight. However, it may be understood that only three second positioners 73 are shown in the drawing for illustrational convenience. The eight second positioners 73 are disposed to be spaced apart from each other on the edge portion of the second rotation plate 72 by preset spacing corresponding to rotation angle (e.g., 45 degrees) of the second rotation plate 72.

Here, the plurality of second positioners 73 may be provided as a block in a cylindrical shape capable of selectively coupling to the locator 63 of the at least one third vehicle body supporting portion 60. For coupling of the locator 63 with each of the plurality of second positioners 73, a coupling groove 69 capable of selectively coupling to each of the plurality of second positioners 73 is formed on a lower portion of the locator 63.

In addition, the at least one second stopper 75 is configured to fix the second rotation plate 72 for each rotation angle. The at least one second stopper 75 is installed on the second fixed bracket 71. The at least one second stopper 75 includes a second stopper body 78 and a second ball 79.

The second stopper body 78 is fixed to the bottom surface of the second fixed bracket 71 along the vehicle height direction. In an example, the second stopper body 78 may be provided as shank in a cylindrical shape.

The second ball 79 is elastically supported at upper end portion of the shank of the second stopper body 78 through a second spring 79a. The second ball 79 may be selectively coupled to a plurality of second stopping holes 72a formed on the second rotation plate 72 by a preset spacing.

A not-yet described reference numeral 70a in the drawing denotes a second cover coupled to an upper portion of the second fixed bracket 71.

Hereinafter, the operation of the apparatus 100 for supporting a vehicle body in assembling according to an exemplary embodiment is described with reference to FIG. 1 to FIG. 13.

First, in an example, in the vehicle body assembling line, the apparatus 100 for supporting a vehicle body during assembly according to an embodiment is transferred to a welding process along a preset path by the transport system 101.

In the welding process, the worker manually adjusts the position of the at least one first vehicle body supporting portion 20 through the at least one first position adjustment unit 30, to be appropriate for the vehicle type of the vehicle body 1 to be assembled.

In this process, the first rotation plate 32 of the at least one first position adjustment unit 30 is rotated by 45 degrees. Accordingly, one of the plurality of first positioners 33 of the at least one first position adjustment unit 30 is correctly positioned at a preset position.

In addition, the first rotation plate 32 is in a state fixed to the first fixed bracket 31 by the at least one first stopper 35. At this time, the first ball 39 of the at least one first stopper 35 is applied with an elastic force of the first spring 39a through the first stopper body 38, and is coupled to one of the plurality of first stopping holes 32a of the first rotation plate 32.

Subsequently, the first moving block 22 of the at least one first vehicle body supporting portion 20 is moved in the vehicle width direction along the first rail block 21. Then, the coupling block 25 of the at least one first vehicle body supporting portion 20 is coupled to one of the plurality of first positioners 33. Here, the first pin engagement hole 37 of one of the plurality of first positioners 33 and the second pin engagement hole 27 of the coupling block 25 are interconnected along the vehicle height direction.

Subsequently, the fixing pin 34 of the at least one first position adjustment unit 30 is fitted into the first pin engagement hole 37 and the second pin engagement hole 27 that are interconnected, and thereby fixes one of the plurality of first positioners 33 to the coupling block 25.

Therefore, the first support block 23 and the first support pin 24 of the at least one first vehicle body supporting portion 20 are correctly positioned at preset positions along the vehicle width direction.

In addition, the worker manually adjusts the position of the at least one second vehicle body supporting portion 40 through the at least one second position adjustment unit 50, to be appropriate for the vehicle type of the vehicle body 1 to be assembled.

In this process, the second mounting bracket 41 of the at least one second vehicle body supporting portion 40 is moved along the vehicle length direction by the worker, and is coupled to the plurality of positioning pins 53 provided on the at least one positioning block 51.

Here, the plurality of positioning pins 53 is fitted into the plurality of bush members 55 provided on the second mounting bracket 41 along the vehicle height direction.

Thereafter, the second mounting bracket 41 is clamped to the at least one positioning block 51 by the at least one toggle clamper 44.

Therefore, the second support block 42 and the second support pin 43 of the at least one second vehicle body supporting portion 40 are correctly positioned at preset positions along the vehicle length direction.

In addition, the worker manually adjusts position of the at least one third vehicle body supporting portion 60 through the at least one third position adjustment unit 70, to be appropriate for the vehicle type of the vehicle body 1 to be assembled.

In this process, the second moving block 62 of the at least one third vehicle body supporting portion 60 is moved in the vehicle height direction (upward direction) along the second rail block 61. Accordingly, the locator 63 of the at least one third vehicle body supporting portion 60 is moved upward through the second moving block 62.

In such a state, the second rotation plate 72 of the at least one third position adjustment unit 70 is rotated by 45 degrees. Accordingly, one of the plurality of second positioners 73 the at least one third position adjustment unit 70 is correctly positioned at a preset position.

Here, the second rotation plate 72 is in a state fixed to the second fixed bracket 71 by the at least one second stopper 75. At this time, the second ball 79 of the at least one second stopper 75 is applied with an elastic force of the second spring 79a through the second stopper body 78, and is coupled to one of the plurality of second stopping holes 72a of the second rotation plate 72.

Subsequently, the locator 63 is moved downward along the second rail block through the second moving block 62. Accordingly, the locator 63 is coupled to one of the plurality of second positioners 73 through the coupling groove 69.

Therefore, the locator 63 is correctly positioned at a preset position along the vehicle height direction.

As described above, positions of the at least one first vehicle body supporting portion 20, the at least one second vehicle body supporting portion 40, and the at least one third vehicle body supporting portion 60 are manually adjusted.

In such a state, the vehicle body lower portion 3 corresponding to the vehicle type of the vehicle body 1 to be assembled is placed on the at least one first vehicle body supporting portion 20, the at least one second vehicle body supporting portion 40, and the at least one third vehicle body supporting portion 60.

Here, the first support pin 24 of the at least one first vehicle body supporting portion 20 is fitted into the at least one first tooling hole 7 formed in the front portion of the vehicle body lower portion 3. In addition, the second support pin 43 of the at least one second vehicle body supporting portion 40 is fitted into the at least one second tooling hole 9 formed in the rear portion of the vehicle body lower portion 3. Furthermore, the center portion of the vehicle body lower portion 3 is located on the locator 63 of the at least one third vehicle body supporting portion 60.

Therefore, the apparatus 100 for supporting a vehicle body in assembling according to an exemplary embodiment may move along a preset path in the welding process, in a state in which the vehicle body lower portion 3 is fixed. Then, in the welding process, the side assembly 4 may be welded to the vehicle body lower portion 3, the roof assembly 5 may be welded to the side assembly 4, and the vehicle body 1 in the body-in-white form may be assembled.

According to the apparatus 100 for supporting a vehicle body in assembling according to an exemplary embodiment, in a vehicle body assembling line for assembling the vehicle body 1 of multiple types of vehicles accompanied by a worker, a position of a supporting point for supporting and holding the vehicle body lower portion 3 may be manually varied according to the vehicle type of the vehicle body 1.

In addition, according to the apparatus 100 for supporting a vehicle body during assembly according to an embodiment, a vehicle type conversion device operated by a motor, or a pneumatic or hydraulic pressure in the conventional art may be removed.

Accordingly, according to the apparatus 100, it is possible to reduce the weight of the vehicle body support equipment and simplify the structure, and reduce the facility investment cost.

Furthermore, since the apparatus 100 may be used as a universal apparatus capable of assembling the vehicle body 1 of five or more vehicle types, it is possible to further improve the flexible productivity of the vehicle body of various types of vehicles.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

The invention claimed is:

1. An apparatus for supporting a vehicle body during assembly, the apparatus comprising:
    a support frame;
    at least one first vehicle body supporting portion installed on a front portion of the support frame configured to be movable in a vehicle width direction;
    at least one first position adjustment unit positioned on the front portion of the support frame and configured to manually vary a position of a corresponding first vehicle body supporting portion;
    at least one second vehicle body supporting portion positioned on a rear portion of the support frame capable of clamping; and
    at least one second position adjustment unit positioned on the rear portion of the support frame and configured to manually vary a position in a vehicle length direction of a corresponding second vehicle body supporting portion;
    wherein the at least one first position adjustment unit comprises:
    a first rotation plate positioned on the front portion of the support frame configured to be rotatable by a preset rotation angle; and
    a plurality of first positioners having different lengths in the vehicle width direction, positioned on an edge portion of the first rotation plate with a spacing corresponding to a rotation angle of the first rotation plate, and selectively coupled to the at least one first vehicle body supporting portion.

2. The apparatus of claim 1, further comprising:
at least one third vehicle body supporting portion positioned on a center portion of the support frame configured to be movable in a vehicle height direction; and
at least one third position adjustment unit positioned on the center portion of the support frame and configured to manually vary a position of a corresponding third vehicle body supporting portion.

3. The apparatus of claim 2, wherein:
the support frame includes a plurality of third mount members disposed on a center portion of the support frame;
the at least one third vehicle body supporting portion is disposed on each of the plurality of third mount members; and
the at least one third position adjustment unit is positioned on each of the plurality of third mount members.

4. The apparatus of claim 1, wherein:
the support frame comprises at least one first mount member disposed in the vehicle width direction in the front portion of the support frame;
the at least one first vehicle body supporting portion is disposed on both sides in the vehicle width direction of the at least one first mount member; and
the at least one first position adjustment unit is positioned on the at least one first mount member.

5. The apparatus of claim 1, wherein:
the support frame comprises at least one second mount member disposed in the vehicle width direction in the rear portion of the support frame;
the at least one second vehicle body supporting portion is disposed on both sides in the vehicle width direction of the at least one second mount member; and
the at least one second position adjustment unit is positioned on the at least one second mount member.

6. The apparatus of claim 1, wherein the at least one first position adjustment unit further comprises:
a first fixed bracket fixed to the front portion of the support frame and rotatably coupled to the first rotation plate through a first handle;
a fixing pin configured to selectively couple the at least one first vehicle body supporting portion and each of the plurality of first positioners; and
at least one first stopper positioned on the first fixed bracket and configured to fix the first rotation plate for each rotation angle.

7. The apparatus of claim 6, wherein each of the plurality of first positioners comprises a first pin engagement hole configured to be coupled by the fixing pin.

8. The apparatus of claim 7, wherein the at least one first vehicle body supporting portion comprises:
a coupling block coupled to each of the plurality of first positioners through the fixing pin, and formed with a second pin engagement hole connectable to the first pin engagement hole.

9. The apparatus of claim 8, wherein each of the plurality of first positioners is provided in a fork shape and configured to be coupled to the coupling block.

10. The apparatus of claim 6, wherein the at least one first stopper comprises:
a first stopper body fixed to the first fixed bracket; and
a first ball elastically supported by the first stopper body through a first spring, and coupled to a plurality of first stopping holes formed on the first rotation plate with a preset spacing.

11. The apparatus of claim 1, wherein the at least one first vehicle body supporting portion comprises:
a first rail block disposed on the front portion of the support frame in the vehicle width direction;
a first moving block coupled to the first rail block configured to be slidable in the vehicle width direction;
a first support block provided on a first mounting bracket fixed to the first moving block and configured to support a vehicle body lower portion;
a first support pin provided on the first support block and configured to be inserted into at least one first tooling hole formed in the vehicle body lower portion; and
a coupling block fixed to the first mounting bracket and coupled to the at least one first position adjustment unit.

12. An apparatus for supporting a vehicle body during assembly, the apparatus comprising:
a support frame;
at least one first vehicle body supporting portion installed on a front portion of the support frame configured to be movable in a vehicle width direction;
at least one first position adjustment unit positioned on the front portion of the support frame and configured to manually vary a position of a corresponding first vehicle body supporting portion;
at least one second vehicle body supporting portion positioned on a rear portion of the support frame capable of clamping; and
at least one second position adjustment unit positioned on the rear portion of the support frame and configured to manually vary a position in a vehicle length direction of a corresponding second vehicle body supporting portion;
wherein the at least one second position adjustment unit comprises:
at least one positioning block disposed along the vehicle length direction on the rear portion of the support frame; and
a plurality of positioning pins installed on the at least one positioning block such that the at least one second vehicle body supporting portion is configured to be attached and detached along the vehicle length direction.

13. The apparatus of claim 12, wherein the at least one second vehicle body supporting portion comprises:
a second mounting bracket provided with a plurality of bush members configured to fit with the plurality of positioning pins;
a second support block provided on the second mounting bracket and configured to support a vehicle body lower portion;
a second support pin provided on the second support block and configured to be inserted into at least one second tooling hole formed in the vehicle body lower portion; and
at least one toggle clamper positioned on the rear portion of the support frame and configured to clamp the second mounting bracket.

14. An apparatus for supporting a vehicle body during assembly, the apparatus comprising:
a support frame;
at least one first vehicle body supporting portion installed on a front portion of the support frame configured to be movable in a vehicle width direction;
at least one first position adjustment unit positioned on the front portion of the support frame and configured to manually vary a position of a corresponding first vehicle body supporting portion;

at least one second vehicle body supporting portion positioned on a rear portion of the support frame capable of clamping;

at least one second position adjustment unit positioned on the rear portion of the support frame and configured to manually vary a position in a vehicle length direction of a corresponding second vehicle body supporting portion;

at least one third vehicle body supporting portion positioned on a center portion of the support frame configured to be movable in a vehicle height direction; and at least one third position adjustment unit positioned on the center portion of the support frame and configured to manually vary a position of a corresponding third vehicle body supporting portion;

wherein each of the at least one third position adjustment unit comprises:

a second rotation plate positioned on the center portion of the support frame configured to be rotatable by a preset rotation angle; and a plurality of second positioners having different lengths in the vehicle height direction, positioned on an edge portion of the second rotation plate with a spacing corresponding to a rotation angle of the second rotation plate, and coupled to the at least one third vehicle body supporting portion.

15. The apparatus of claim 14, wherein the at least one third position adjustment unit further comprises:

a second fixed bracket fixed to the center portion of the support frame and rotatably coupled to the second rotation plate through a second handle; and at least one second stopper positioned on the second fixed bracket and configured to fix the second rotation plate for each rotation angle.

16. The apparatus of claim 15, wherein the at least one second stopper comprises:

a second stopper body fixed to the second fixed bracket; and a second ball elastically supported by the second stopper body through a second spring, and coupled to a plurality of second stopping holes formed on the second rotation plate with a preset spacing.

17. The apparatus of claim 14, wherein the at least one third vehicle body supporting portion comprises:

a locator movable in the vehicle height direction, and formed with a coupling groove configured to couple to each of the plurality of second positioners.

18. The apparatus of claim 14, wherein the at least one third vehicle body supporting portion comprises:

a second rail block disposed in the vehicle height direction on the center portion of the support frame;

a second moving block coupled to the second rail block and slidable in the vehicle height direction; and a locator coupled to a third mounting bracket fixed to the second moving block to support a vehicle body lower portion, and coupled to the at least one third position adjustment unit.

\* \* \* \* \*